United States Patent Office 3,347,642
Patented Oct. 17, 1967

3,347,642
PROCESSES FOR THE RECOVERY OF URANIUM
Thomas Garfield Thomas, Lea, near Preston, and Stanley George Wilson, Frodsham, near Chester, England, assignors to United Kingdom Atomic Energy Authority, London, England
No drawing. Continuation of application Ser. No. 790,396, Feb. 2, 1959. This application Sept. 3, 1964, Ser. No. 394,315
Claims priority, application Great Britain, Feb. 17, 1958, 5,043/58
4 Claims. (Cl. 23—342)

This application is a continuation of application Ser. No. 790,396, filed Feb. 2, 1959, and now abandoned.

This invention relates to the recovery of uranium values from magnesium fluoride and calcium fluoride slags.

Uranium metal may be produced by interaction of uranium tetrafluoride with either magnesium or calcium. One of the reaction products is then a fluoride slag which may during cooling entrap droplets of uranium and/or dispersions of uranic materials which it is desirable to recover.

A known process for recovery of such uranium from magnesium fluoride slags is described in "Chemical Engineering Progress" (vol. 53, No. 2 (February 1957) pages 56F–59F) and involves the following successive steps:

(1) Roasting and fine-grinding of the slag;
(2) Leaching the roasted and finely-ground slag with hydrochloric acid to bring the uranium into solution;
(3) Precipitating the uranium from the filtered leach liquor as insoluble uranyl ammonium phosphate;
(4) Converting the uranyl ammonium phosphate to a sodium di-uranate by interaction with sodium hydroxide solution; and (presumably)
(5) Conversion of this sodium di-uranate to a solution suitable for a refinery process. (In this step nitric acid liquor is treated in stainless steel equipment, but in the absence of fluoride ions.)

It is thought that the known process described above was developed to avoid the serious corrosion problem which occurs when nitric acid leaching of fluoride slags is applied in stainless steel containers.

The present invention which has an object to provide a simpler and less expensive process for producing a solvent extraction refinery feed from uranium containing fluoride slags is based on the discovery that by control of nitric acid strength and more particularly temperatures, a satisfactory leaching of magnesium and calcium fluoride slags can take place in stainless steel vessels with an acceptable and predictable corrosion rate.

According to the present invention magnesium fluoride of calcium fluoride, arising from the production of uranium from uranium tetra fluoride, is leached in stainless steel equipment with nitric acid so that the acidity is finally between ½ normal and 5 normal, the leach being carried out at between 40° C. and 60° C. to bring substantially all the uranium into aqueous solution. The solution may then be treated with any organic solvent suitable for uranium extraction in a known manner.

One way of carrying out the process of the invention will now be described in more detail in the particular case of magnesium fluoride slag and with tributyl phosphate as the organic solvent.

Magnesium fluoride slag is crushed to approximately ½ in. size and ground in a wet ball mill sufficiently for 98% to pass a 60 mesh B.S.S. sieve. The use of the wet grind avoids hazards arising from dust or fire. The mill product slurry is preferably 70% solids by weight, and is then leached by admixture with 60% w./w. nitric acid (i.e. 13-normal acid) for a period of 12 hr. while the temperature is maintained at 60° C. The final acidity of the aqueous phase of the leach slurry becomes 1½-normal by virtue of the predetermined relative proportions of acid and mill slurry used and no need arises to bring about concentration by boiling which would cause bad corrosion. An acidity of lower than ½-normal and a temperature of lower than 40° C. does not secure satisfactory extraction of uranium. This leach is carried out in a stirred container made of austenitic stainless steel containing approximately 18% chromium, 8% nickel and 1% titanium, suitably welded and heat-treated. It may be an advantage then to add lime or some other convenient base to neutralise part of the remaining acidity and to convert the said part of the acidity to, for example, calcium nitrate. The leach slurry is then filtered and the solids are washed substantially free from uranium. It may be an advantage to make an addition of a conditioning or flocculating agent beforehand if the leach slurry contains a proportion of fines which would otherwise impair the filtration. We have found "Separan 2610" (reg. trade mark) to be effective for this purpose. It may then become possible to separate up to 40% by volume of the liquid phase by simple decantation so that filtration need only be made for the remainder. The filtrate with or without any decantate and with or without any washings is then contacted with 20% v./v. tributyl phosphate dissolved in odourless kerosene to extract the uranium according to known methods.

The fluoride content of the aqueous phase is not sufficient at the temperature used to cause excessive corrosion of the stainless steel container nor to impair the solvent extraction of uranium to a significant extent. We have found the aqueous phase to contain typical 4 gm. of fluorine per litre and 40 milligrams of nickel per litre, part of which nickel will have been derived from the slag and only the remainder from corrosion of the stainless steel leaching equipment. If the final concentration of nitric acid is excessive it may be extracted by the solvent in undue degree in preference to the uranium though in the example we give this is not marked at acidities of below 5-normal. Nitrates of the commoner bases are not usually extracted by the uranium solvents to any substantial degree and are on the contrary usually beneficial in promoting the desired extraction of uranium.

We claim:

1. A method of leaching uranium from a fluoride slag arising from the production of uranium from uranium tetrafluoride using nitric acid alone as the leaching agent said method comprising the steps of providing a stainless steel container, mixing nitric acid with slag in the container, the nitric acid being used in predetermined amounts adapted to achieve a final and total acidity of ½ normal to 5 normal in respect of nitric acid only, and heating the slag and acid in contact with the container to a temperature in the range 40° C. to 60° C. thereby bringing uranium into aqueous solution with acceptable corrosion of the stainless steel container.

2. A method of leaching uranium from a fluoride slag arising from the production of uranium from uranium tetrafluoride using nitric acid alone as the leaching agent said method comprising the steps of providing a stainless steel container, mixing nitric acid with slag in the container, the nitric acid being used in predetermined amounts adapted to achieve a final and total acidity of ½ normal to 1½ normal in respect of nitric acid only, and heating the slag and acid in contact with the container to a temperature in the range 40° C. to 60° C. thereby bringing uranium into aqueous solution with acceptable corrosion of the stainless steel containers.

3. A method of leaching uranium from a fluoride slag arising from the production of uranium from uranium tetrafluoride using nitric acid alone as the leaching agent said method comprising the steps of providing a stainless steel container, mixing nitric acid with slag in the container, the nitric acid being used in predetermined amounts adapted to achieve a final and total acidity of ½ normal to 5 normal in respect of nitric acid only, and heating the slag and acid in contact with the container to a temperature in the range 40° C. to 60° thereby bringing uranium into aqueous solution with acceptable corrosion of the stainless steel container at fluoride levels of about 4 grams of fluorine per liter of said aqueous solution.

4. A method of leaching uranium from a fluoride slag arising from the production of uranium from uranium tetrafluoride using nitric acid alone as the leaching agent said method comprising the steps of providing a stainless steel container, mixing nitric acid with slag in the container, the nitric acid being used in predetermined amounts adapted to achieve a final and total acidity of ½ normal to 1½ normal in respect of nitric acid only, and heating the slag and acid in contact with the container to a temperature in the range 40° C. to 60° C. thereby bringing uranium into aqueous solution with acceptable corrosion of the stainless steel containers at fluoride levels of about 4 grams of fluorine per liter of said aqueous solution.

No references cited.

BENJAMIN R. PADGETT, *Primary Examiner.*

R. L. GRUDZIECKI, *Assistant Examiner.*